United States Patent [19]

Hertz et al.

[11] 4,050,075
[45] Sept. 20, 1977

[54] INK JET METHOD AND APPARATUS

[76] Inventors: Carl Hellmuth Hertz, Skolbanksvagen 8, S-223 67; Jan Birger Franz Welinder, c/o Lund Institute of Technology, both of Lund, Sweden

[21] Appl. No.: 620,358

[22] Filed: Oct. 7, 1975

[30] Foreign Application Priority Data

Oct. 17, 1974 Sweden .............................. 74130782

[51] Int. Cl.² ............................................ G01D 15/18
[52] U.S. Cl. .................................. 346/75; 346/140 R
[58] Field of Search ........................... 346/75, 140, 29

[56] References Cited

U.S. PATENT DOCUMENTS

| | | | |
|---|---|---|---|
| 3,510,878 | 5/1970 | Johnson | 346/75 X |
| 3,564,120 | 2/1971 | Taylor | 346/75 X |
| 3,596,275 | 7/1971 | Sweet | 346/75 X |
| 3,737,914 | 6/1973 | Hertz | 346/75 |
| 3,781,907 | 12/1973 | Gerber | 346/140 |
| 3,787,884 | 1/1974 | Demer | 346/75 |
| 3,909,831 | 9/1975 | Marchio | 346/140 |
| 3,916,421 | 10/1975 | Hertz | 346/75 |
| 3,968,498 | 7/1976 | Uchiyama | 346/29 |

Primary Examiner—Joseph W. Hartary
Attorney, Agent, or Firm—Bessie A. Lepper

[57] ABSTRACT

Method and apparatus for making plots and mechanical drawings having predetermined and accurately controlled line widths directly from data from computers or other suitable sources. An ink-jet writing system is mounted on a traveling carriage and relative movement between it and a receptor surface is effected. Functions of the rate of such movement in the plotting directions are determined and used to generate a corrective signal fed to the ink-jet system to adjust the amount of ink reaching the receptor surface to thus create lines of controlled widths irrespective of the rate at which this relative movement takes place. Characters or other signs and symbols may be generated using the method and apparatus of this invention.

2 Claims, 14 Drawing Figures

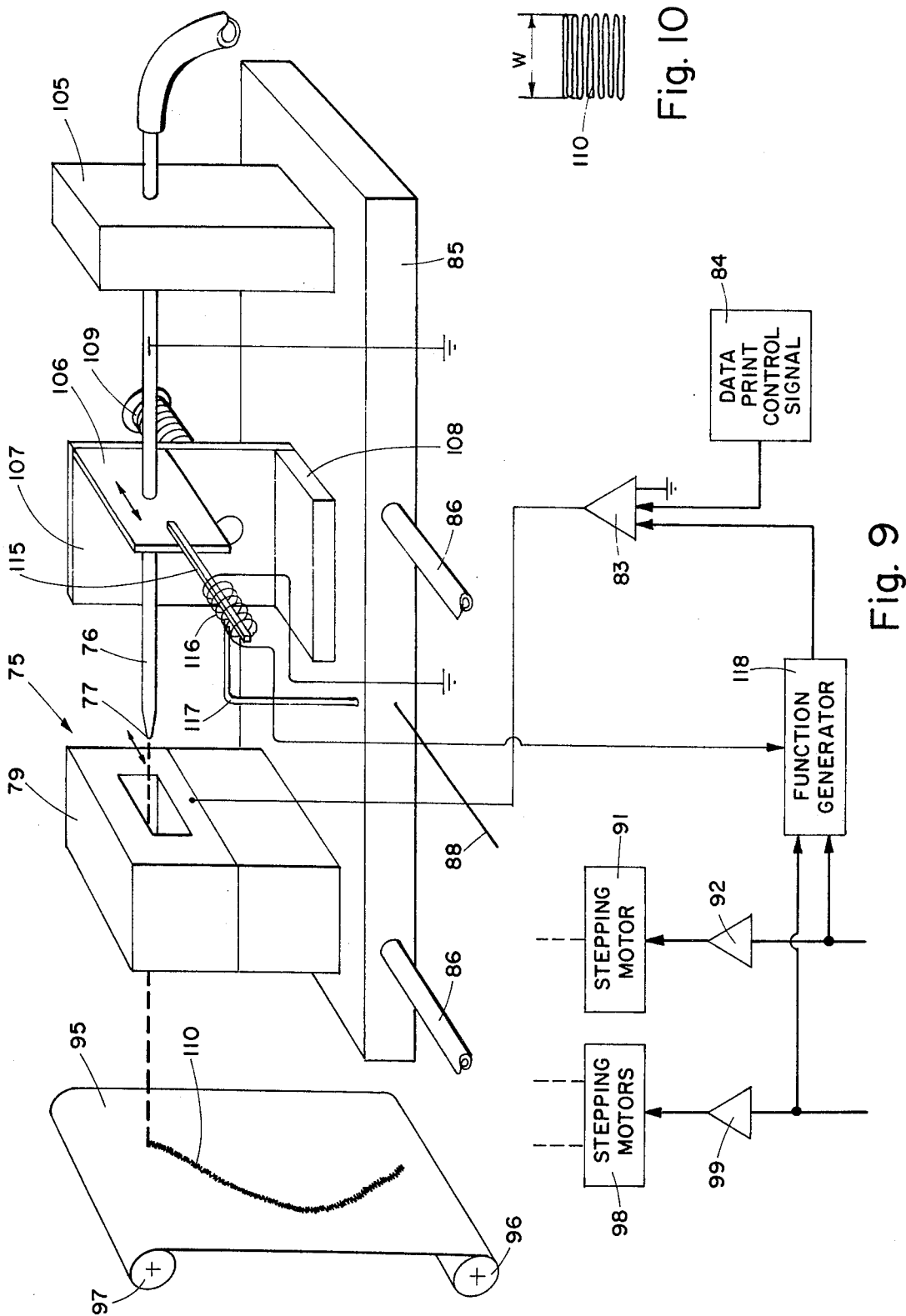

INK JET METHOD AND APPARATUS

This invention relates to method and apparatus for plotting, e.g., forming X-Y plots and for making mechanical and other drawings, and more particularly to such method and apparatus which employ one or more ink jets as styluses and are capable of using data directly from sources such as computers.

During the last decade, X-Y plotters, antenna pattern plotters and mechanical drafting machines, controlled by electric signals from a computer or similar signal source, have come into steadily increasing use, both for presenting calculation results of the computers and for preparing engineering drawings. The reason for this is the higher plotting speed and the improved accuracy which can be achieved with such machines.

This high plotting speed, however, entails the use of special styluses as plotting elements. These styluses are in general mounted on a recording head which can be moved in the direction of the X-axis and of the Y-axis, respectively, in relation to a paper surface. Examples of such drafting machines are given by L. A. Bergstrom and M. Jern in the publication "Introduction Till Grafisk Informationsbehandling" In English: Introduction to Graphic Information Processing. (Student-litteratur, Lund, 1973 pages 22–23.) For the styluses, use is often made, for example, of ball-point pens, and the recording head may be mounted on a traveling carriage above the paper surface.

In order to be able to satisfy the great accuracy requirements placed upon such machines, the traveling carriage and the recording head must be of robust construction and, therefore, they have considerable mass. Because of this, the stylus cannot be moved at a constant speed, since the recording head and the carriage must be accelerated and decelerated, respectively, at the beginning and the end of the line to be drawn by the stylus between two points. It is obvious that the drafting machine cannot draw at its maximum speed when it is to plot small alphanumeric symbols.

The result of this state is that the plotting speed of these drafting machines is not constant. This means that the width of the line, generated by a ball-point pen, for example, on the paper is not constant, but is slightly thicker at the beginning and the end of the line where the plotting speed is not at its maximum. These conventional styluses have, furthermore, the disadvantage that they are unable to plot at speeds above approximately one meter per second without there being a break in the plotting line and/or heavy mechanical abrasion of the stylus.

It would, therefore, be of great advantage if one could replace the more conventional form of stylus with a fine ink jet which emerges from a nozzle under high pressure and is directed towards the drawing surface. The diameter of the ink jet is suitably selected at between 10 and 30 μm, its speed at 10–40 meters per second and the spacing of the nozzle to the paper at 15 to 40 mm. With such ink jets it is possible to achieve plotting speeds of more than 5 meters per second, which should be sufficient for practically all the plotting needs which may arise. Furthermore, it is possible to electrically switch such ink jets on or off, as is described in the prior art described below. Because of this ability to achieve electrical switching, the trace being plotted can be rapidly interrupted, for example in order to commence plotting at a different point on the drawing surface.

It is, however, also obvious that the ink jet suffers from the same disadvantages as conventional styluses when the recording head of the drafting machine moves at varying speeds. Because the ink may emerge from the nozzle at a constant flow rate, the amount of ink which is applied to the drawing surface per unit of length is dependent on the plotting speed. This also entails that the width of the trace plotted is dependent upon the speed at which the trace has been plotted.

It can be seen that it would be desirable to have a method and apparatus which make it possible to take advantages of the advantages associated with ink-jet printing (electrical control, high speed and the like) while at the same time providing an improved form of stylus plotting and mechanical drafting. For convenience in describing the method and apparatus of this invention it will be assumed that an X-Y plot is to be formed. This invention is, however, equally applicable to other types of plotters, e.g., antenna pattern plotters.

It is therefore a primary object of this invention to provide an improved apparatus for making plots and/or doing mechanical drafting. Another object is to provide apparatus of the character described which is operated and controlled by electrical signals from a computer or other appropriate source and which is capable of producing lines of highly uniform widths. Still another object of this invention is to provide a plotting and/or drafting apparatus which is rapid, accurate and readily controlled. A further object is to provide such apparatus which may optionally have the capability of varying the width of lines over a relatively large range and of printing complex characters, signs, and symbols.

It is another primary object of this invention to provide an improved process for making plots and/or making drawings, the lines of which are uniform in width. Yet another object is to provide such a process which is capable of attaining much higher drawing velocities than can be realized through the use of conventional styluses, and which offers additional optional modifications such as accurately varying the width of the lines, and drawing complex characters or signs.

Other objects of the invention will in part be obvious and will in part be apparent hereinafter.

According to one aspect of this invention there is provided apparatus for X-Y plotting and for making drawings which comprises in combination ink-jet writing means affixed to a traveling carriage, means to sense a function (e.g., velocity or acceleration) of the relative movement between a receptor on which the ink-jet is writing and the carriage on which the ink-jet apparatus is mounted and means to employ that function in the form of a corrective signal to the ink-jet apparatus to control the flow and/or disposition of the ink to maintain a predetermined line width in the plot or drawing. In keeping with known ink-jet technology, the ink-jet apparatus will comprise a nozzle, an ink supply, means to force the ink through the nozzle to form a stream of droplets, electrode means to control the final disposition of the droplets, and data print control signal means to transmit signals to the electrode means, the signals being predeterminative of the final disposition of the droplets.

Relative movement between the carriage and receptor may be realized by moving the carriage in both the X- and Y-directions, or by moving the carriage in one of these directions and the receptor in the other. The means of this invention for maintaining predetermined line widths in X-Y plots and mechanical drawings are applicable to all of the known types of ink-jet apparatus.

In another aspect of this invention, there is provided a method for rapidly making X-Y plots and mechanical drawings using data taken directly from a computer or other suitable source which comprises the steps of providing a source of a stream of liquid droplets, electrically controlling the final disposition of the droplets, effecting relative movement between the source of the liquid droplets and a receptor against which they are directed, sensing a function of the relative movement to generate a corrective signal and employing the corrective signal to adjust the electrical controlling of the droplet disposition.

The invention accordingly comprises the several steps with respect to each of the others, and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a much enlarged and diagrammatic representation of the manner in which line width is controlled through control of pulse frequency and/or pulse duration;

Figure 3:
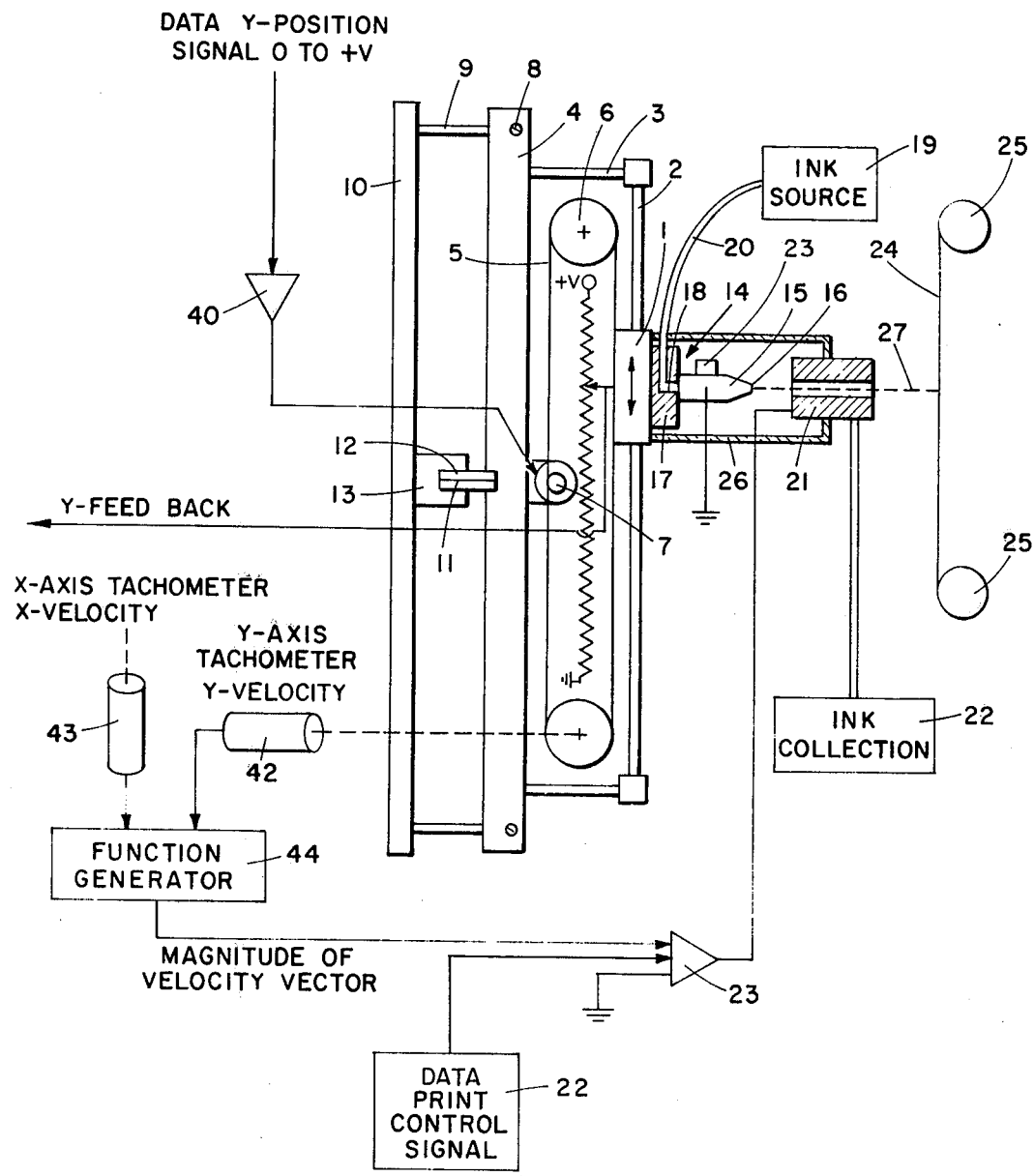
FIG. 3 illustrates, in a somewhat diagrammatic side elevation view, one embodiment of the application of this invention to the carriage of FIG. 2 in which velocity of the traveling carriage is used to develop a corrective signal.
Figure 5:
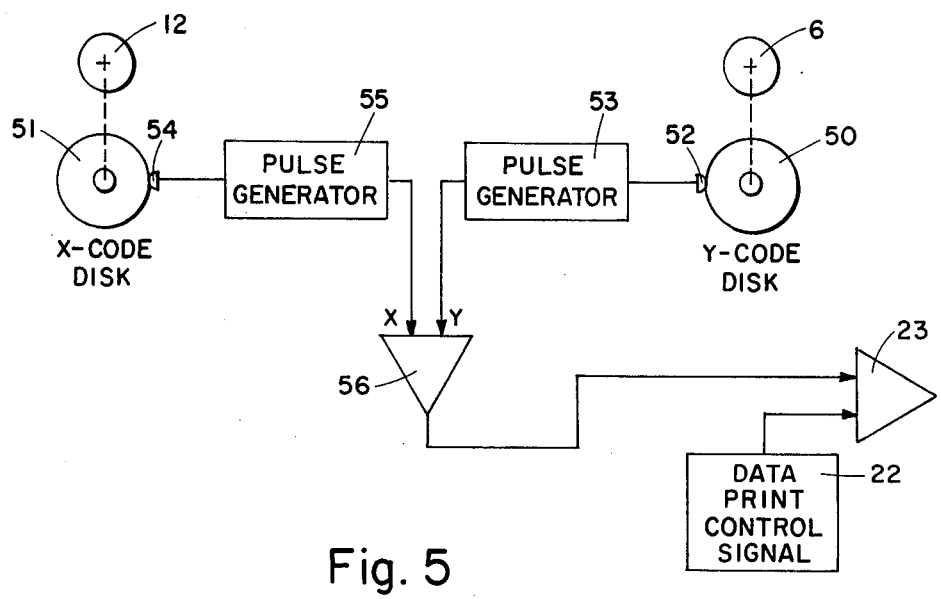
Figure 6:
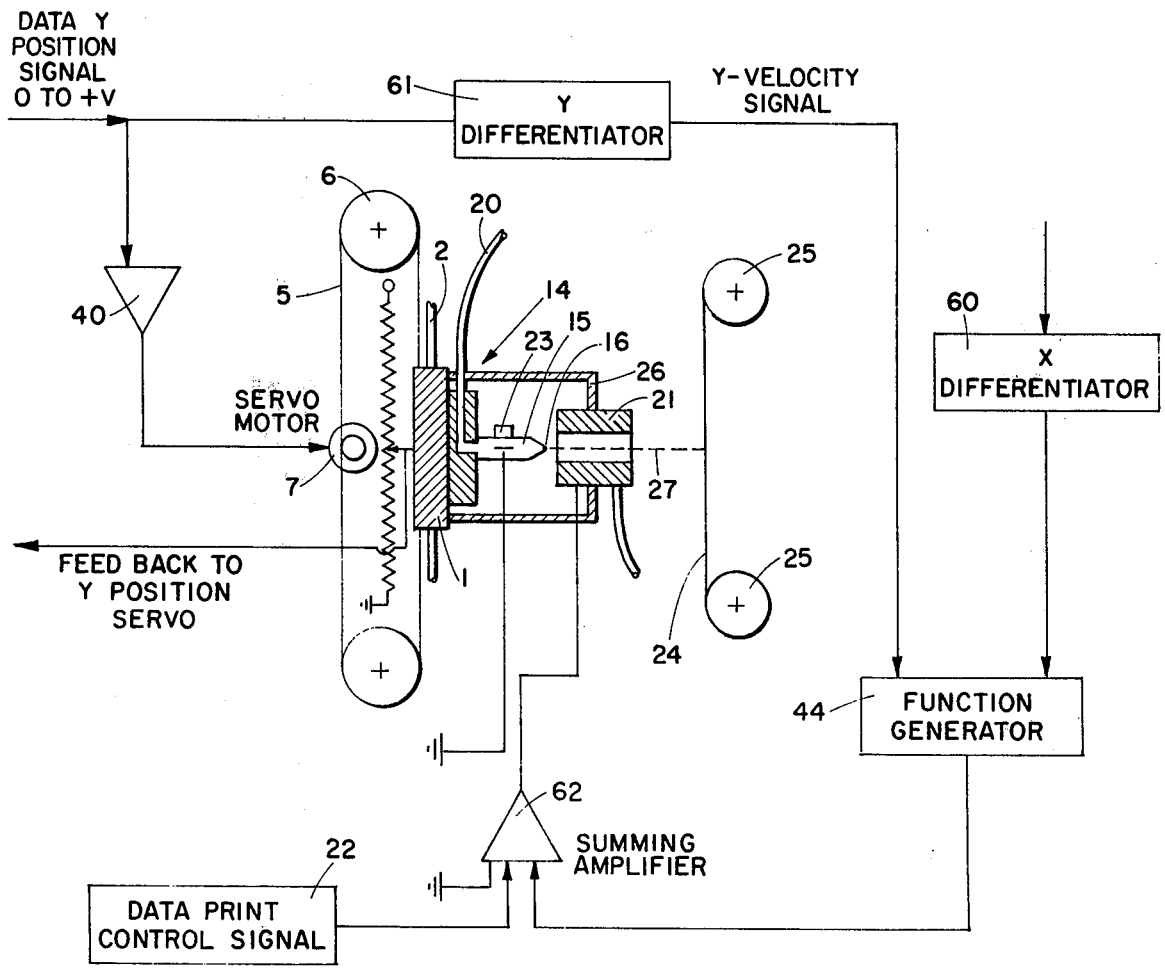
Figure 7:
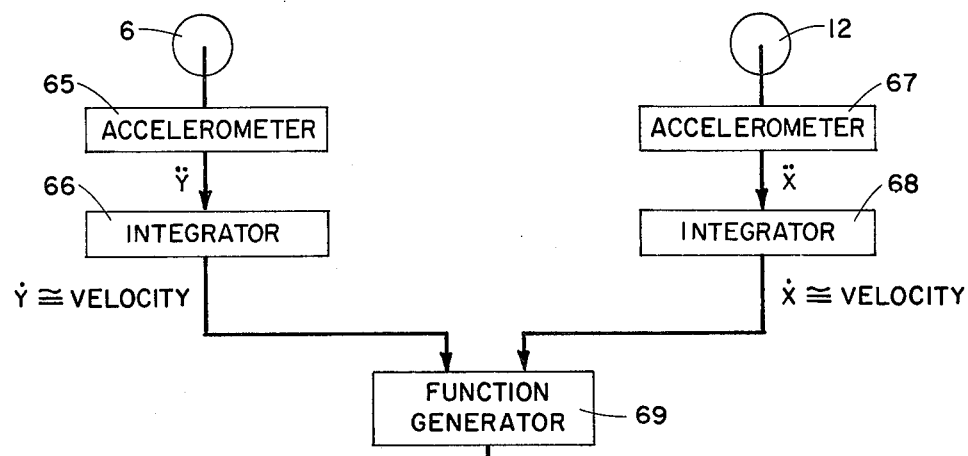
Figure 8:
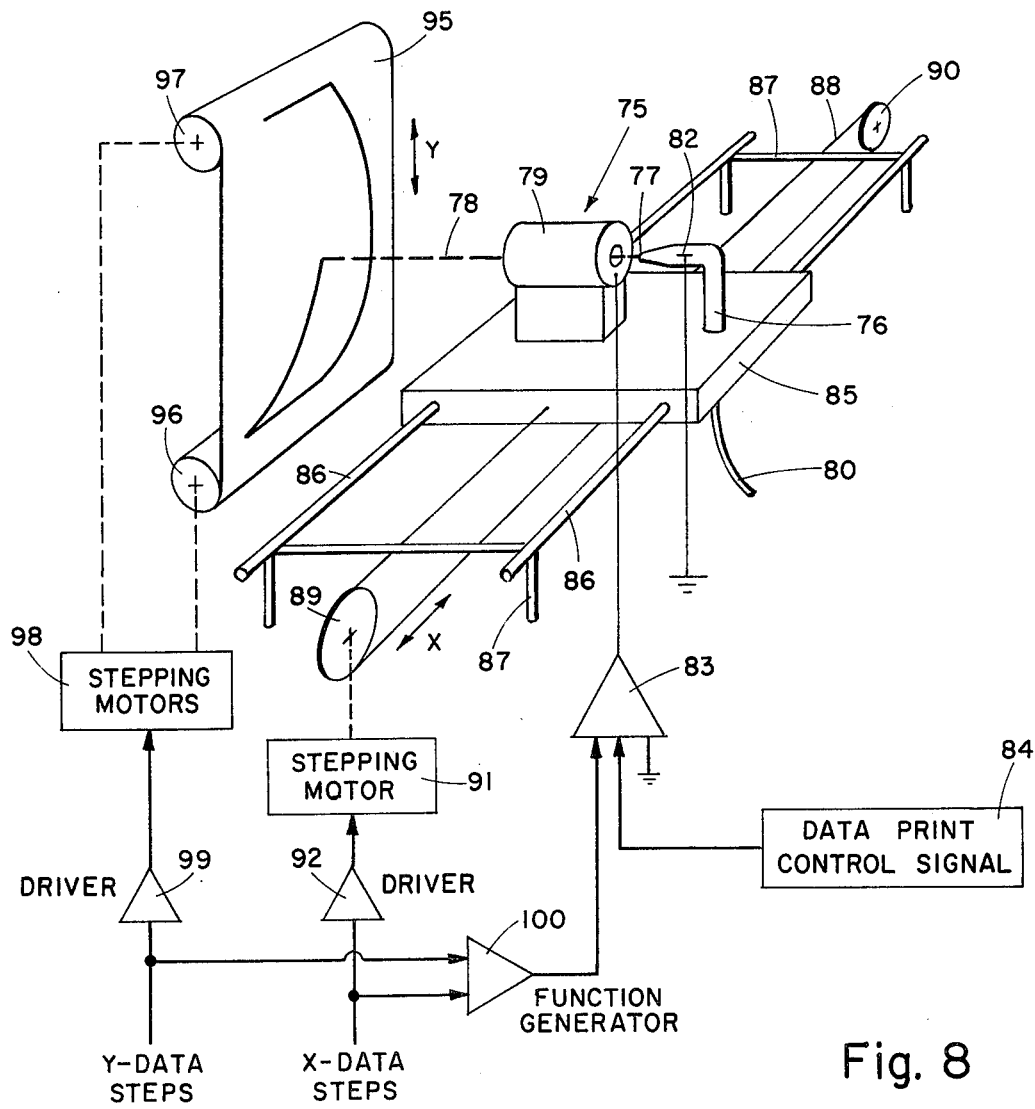
Figure 12:
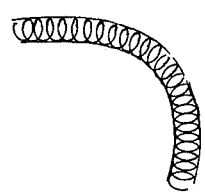
Figure 11:
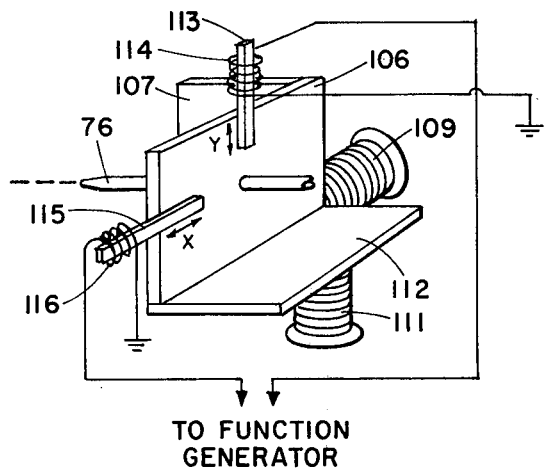
Figure 13:
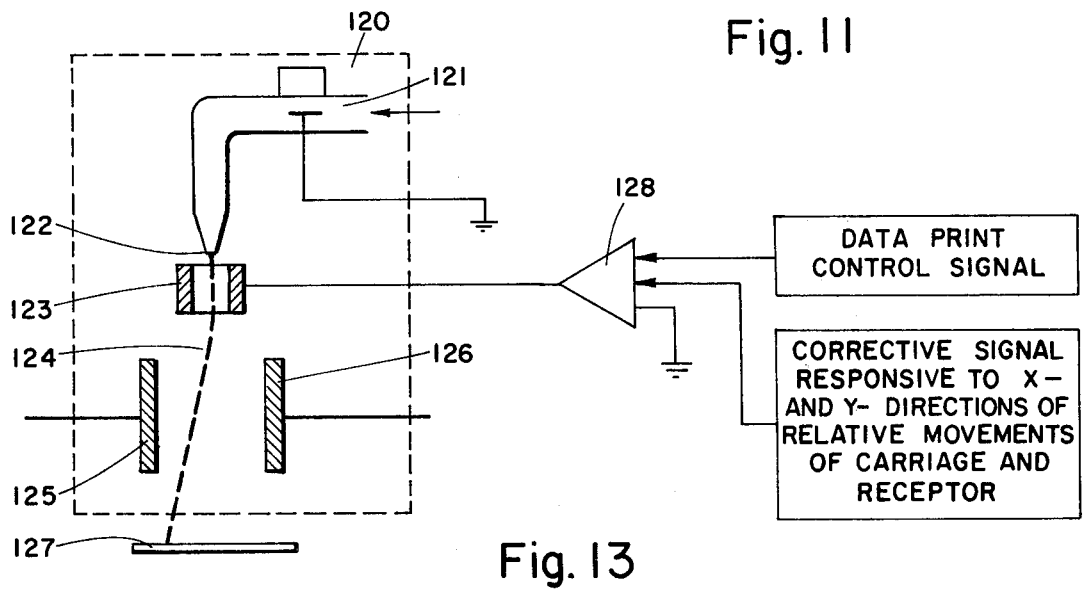
Figure 14:
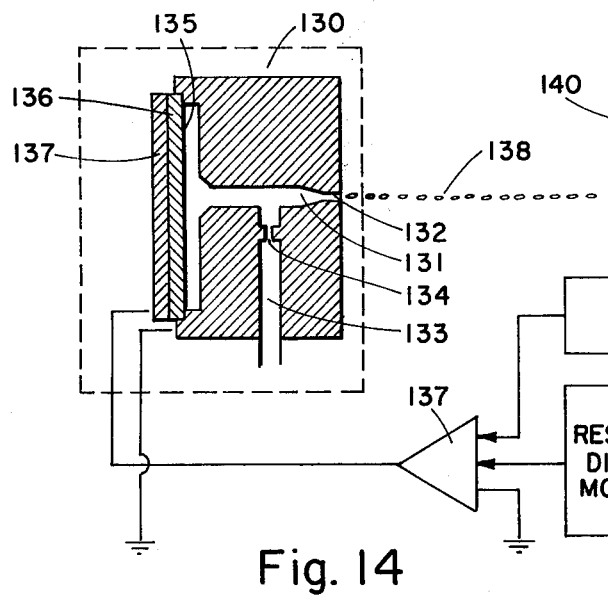

FIG. 5 diagrams a modification of the apparatus of FIG. 3 in which code disks are used;

FIG. 6 is a somewhat diagrammatic side elevation view of another embodiment of this invention in which velocity of the traveling carriage is used to develop a corrective signal;

FIG. 7 illustrates another embodiment of the sensing and corrective signal generation means of this invention using acceleration of the traveling carriage as the relative movement function;

FIG. 8 shows, partly in perspective and partly in diagram, an embodiment of this invention in which relative movement between the ink-jet carriage and receptor is effected by moving both of these components and in which stepping motors are used;

FIG. 9 is a perspective view of a modification of the ink-jet apparatus of this invention in which means are incorporated to vibrate the ink jet nozzle to adjust the line width;

FIG. 10 is an enlargement of part of a line formed with the apparatus of FIG. 7;

FIG. 11 shows in fragmentary form a modification of the apparatus of FIG. 9 in which the ink jet nozzle is orbited in both X- and Y-directions;

FIG. 12 illustrates the form of ink-jet line formed using the modification of FIG. 11;

FIG. 13 illustrates the application of this invention to a type of ink-jet apparatus such as that described in U.S. Pat. No. 3,596,275; and FIG. 14 illustrates the application of this invention to yet another type of ink-jet apparatus such as that described in U.S. Pat. No. 3,747,120.

The above-noted disadvantages associated with the use of a relatively massive traveling carriage in X-y plotters and automatic drawing machines can, by the method and apparatus of this invention, be counteracted in an effective manner by the use of ink-jet writers which are controlled by electrical signals in one of several ways. Examples of one type of suitable apparatus are described by Hertz in U.S. Pat. Nos. 3,416,153, 3,673,601 and 3,717,875 and United States application Ser. No. 481,122 now Pat. No. 3,916,421, filed in the name of one of the inventors herein. In these apparatus, the ink jet on its way to the drawing surface must pass a suitable electrode system to which an electrical signal voltage is connected. The jet is then influenced in such a way that it can be prevented from reaching the drawing surface in response to the voltage of the signal. This permits an on/off modulation of the trace being plotted.

If one now uses, as a control signal, e.g., an electric pulse train of a suitable frequency, and impresses this control signal on a control electrode in accordance with U.S. Pat. Nos. 3,416,153 and 3,673,601 the ink jet is influenced in such a way that the ink reaches the paper only during those times when the control signal is zero. If, on the other hand, the control signal is, for example, 200 volts it does not reach the drawing surface. Thus, one can achieve in this way an on/off modulation of the trace being plotted. If one now chooses the pulse frequency such that the ink jet is permitted to pass, say 10 times while the recording head moves 1 mm, 10 points will be made on the drawing surface, forming a practically continuous trace plotting. By changing the pulse length or the pulse frequency of the control signal it is then possible to regulate the amount of ink applied to the drawing surface per unit of length and thereby indirectly the width of the trace plotted. This is illustrated in a simplified, diagrammatic manner in FIG. 1.

Figure 1:
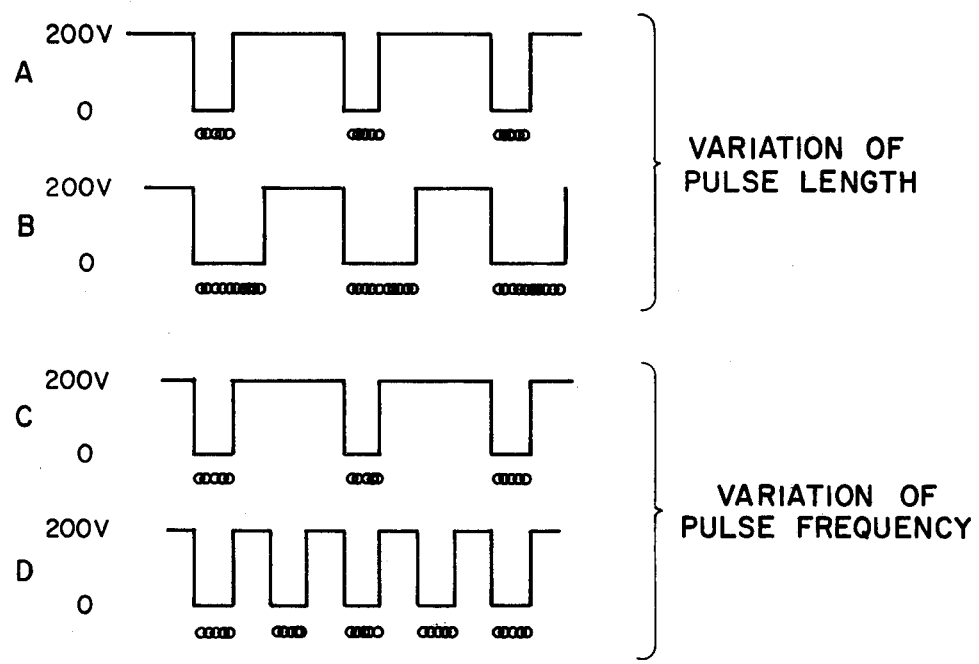

In FIG. 1, in which time is plotted against electrode voltage used to achieve on-off modulation, the effect of varying the pulse length and the pulse frequency on line width is illustrated. In all cases, the speed of the carriage is such that the ink drops overlap and the more ink deposited per unit length of line drawn, the wider will be the line. Thus it will be seen from FIG. 1 in a comparison of Curves A and B where the pulse length in B is greater than that for Curve A, the width of the line resulting from operating under the conditions of Curve B will be greater than under the conditions of Curve A. Likewise a comparison of Curves C and D shows that increasing the frequency brings about the deposition of a greater amount of ink per unit length of line. It should, however, be noted that the increase in width is not necessarily directly proportional to the increase in the amount of ink deposited per unit length of the line.

An example of another type of ink-jet apparatus suitable for this invention is described in U.S. Pat. No. 3,596,275 to Sweet. In this type of ink-jet writer, as each individual ink droplet is formed it is directed through an electrode which gives it an electrostatic charge which is a function of the instantaneous value of an input signal which is to be recorded. The charged droplets are caused to pass between a pair of electrostatic deflection plates to which a constant high-voltage is applied. As each droplet passes through this field it is deflected from its normal path by an amount which is a function of the magnitude of the charge on it and in a direction which is a function of the polarity of its charge. In the case of ink-jet apparatus of the type of U.S. Pat. No. 3,596,275 it is possible to regulate the amount of ink applied to the drawing surface by regulating the magnitude of the electrostatic charge placed upon each droplet by the charging electrode. Thus the input signal to the electrode may be modified to correspond to the relative movement of the traveling carriage and receptor.

The ink-jet apparatus of Hertz and Sweet may be classed as continuous jet types. There are, however, also ink-jet apparatus which may be classed as "on-demand," i.e., apparatus in which the ink droplets are provided only when required. Exemplary of such apparatus is the ink-jet writer described in U.S. Pat. No. 3,747,120. In such devices the ink is contained in a fluid chamber which terminates in a nozzle and it is forced through the nozzle to form drops when a pressure pulse is applied to a diaphragm forming a fluid contact area in the chamber. The pressure pulses are applied by applying a predetermined signal voltage to a piezoelectric crystal fixed to the diaphragm. Thus in this type of ink-jet writer it is possible to control the amount of ink reaching the receptor by controlling the pulse rate of the voltage signal applied to the piezoelectric crystal through electrode means.

With the use of the Hertz ink-jet system it is possible to maintain a constant width of the trace being plotted or drawn by controlling the pulse frequency while maintaining pulse length constant or by controlling the pulse length while maintaining pulse frequency constant. The apparatus of this invention using a Hertz ink-jet system and pulse frequency control as exemplary of ink-jet apparatus are illustrated in FIGS. 2–11.

Figure 2:
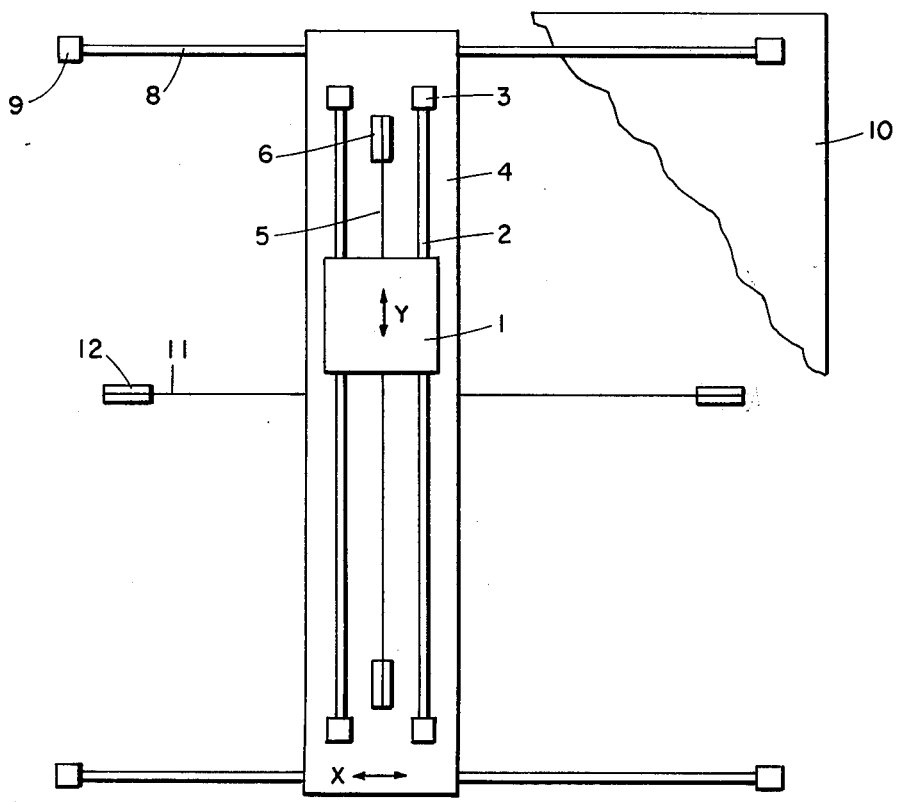
FIG. 2 is a top planar view of an exemplary traveling carriage for X-Y plotting.

In FIG. 2 there is shown a top planar view of an exemplary traveling carriage means suitable for X–Y plotting. Such a carriage means, as well as other suitable types of carriages, are commercially available and it is therefore only necessary for the purposes of this invention to illustrate a traveling carriage means in a simplified manner. The carriage means of FIG. 2 comprises an upper carriage 1 slidably movable in the Y-direction on parallel bars 2 suitably mounted through supports 3 on a lower carriage 4. Motion of upper carriage 1 is achieved by means of an endless cord 5 traveling on oppositely disposed rollers 6 and driven by a servomotor 7 (FIG. 3). Lower carriage 4 is slidably movable in the X-direction on parallel bars 8 suitably mounted through supports 9 on a base 10. Motion of lower carriage 4 is achieved by means of an endless cord 11 traveling on oppositely disposed rollers 12 and driven by servomotor 13 (FIG. 4).

In FIG. 3 the ink-jet writer, indicated generally by reference number 14, as seen to comprise an ink supply means in the form of a capillary 15 which terminates in nozzle 16 and is affixed to a support 17 through which an ink conduit 18 passes to be joined to an ink source 19 by means of line 20; and electrode 21 having ink collection means 22 associated therewith; and driving means 23 (e.g., a piezoelectric crystal) for vibrating capillary 15 to obtain uniform droplet size. It will be appreciated that the illustrations of the ink-jet writers in the drawings are not presented in any detail and that they may take any of the forms described in the above-identified patents and patent applications. Electrode 21 is connected to a data print control signal source 22 through amplifier 23. A receptor sheet 24 (e.g., a strip of paper) is supported between parallel rolls 25. Such an ink-jet system is described in detail in U.S. Pat. Nos. 3,416,153 and 3,673,601 and in Ser. No. 481,122 now U.S. Pat. No. 3,916,421. Capillary 15 with nozzle 16 is mounted on upper carriage 1 of the traveling carriage means through support 14 which is affixed directly to it; and the electrode 17 is affixed to the carriage through an insulating support member 26. There are, of course, several known ways of moving the traveling carriage, and hence for moving nozzle 16 from which droplets 27 are ejected toward receptor 24. In the apparatus of FIGS. 2–4, the carriage is moved in both the X- and Y-directions while receptor 24 remains stationary.

As will be seen in FIG. 3, data Y-position signals from zero to $+V$, derived from a computer or other appropriate source, are fed through amplifier 40 to the servomotor 7 which moves upper carriage 1 over a spatial range corresponding to zero to $+V$. In like manner, as will be seen in FIG. 4, data X-position signals from zero to $+V$ are fed through amplifier 30 to the X-movement servomotor 13 thus imparting X- and Y-movement to upper carriage 1 and hence to the source of ink droplets 27.

Figure 4:
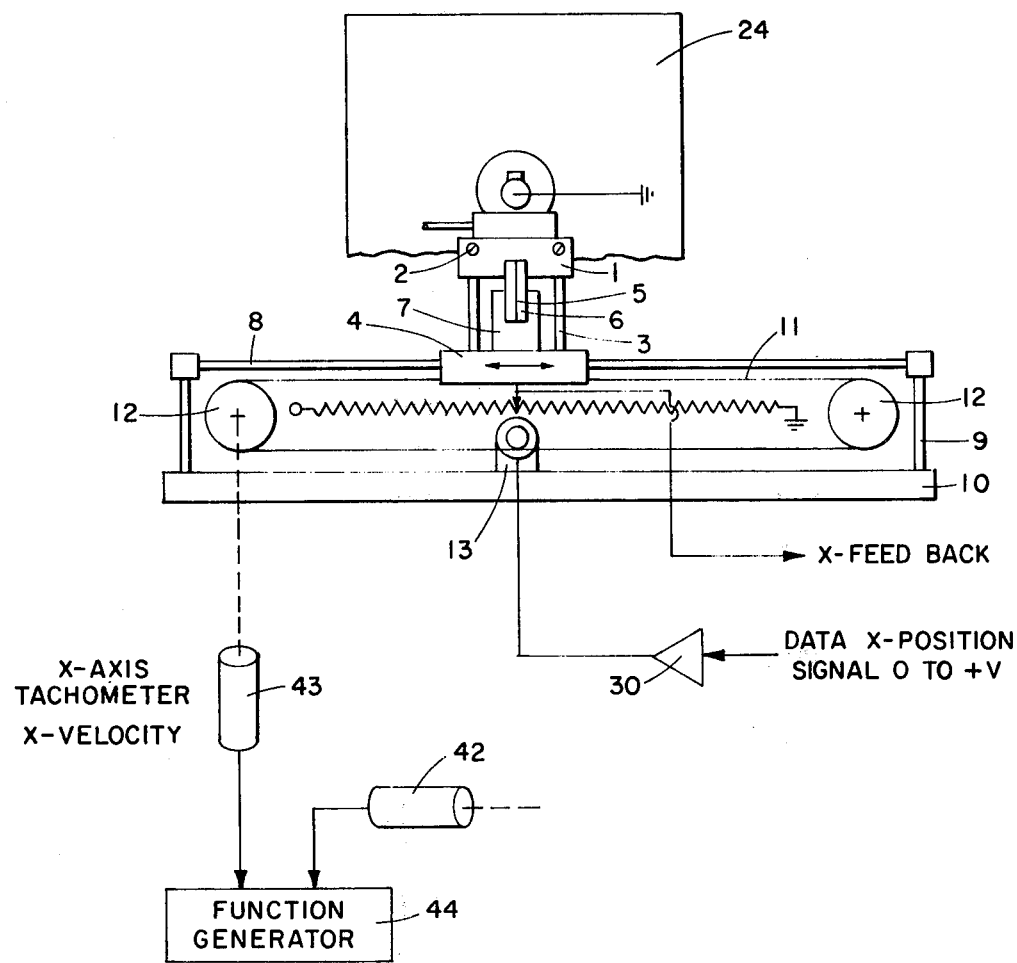
FIG. 4 is a simplified, somewhat diagrammatic back elevation view of the apparatus of FIG. 3.

A Y-axis tachometer 42 is mechanically linked to one roller 6 and an X-axis tachometer 43 is mechanically linked to one roller 12 (FIG. 4). Signals from tachometers 42 and 43 which are representative of the carriage velocity in the Y- and X-directions, respectively, are transmitted to a function generator 44 which typically determines $\sqrt{\dot{X}^2 + \dot{Y}^2}$, where $\dot{X}$ and $\dot{Y}$ are carriage velocities in the X- and Y-directions, respectively, to develop a corrective signal which is a function of the magnitude of the velocity vector associated with the relative movement between upper carriage 1 and receptor 24. This corrective signal, transmitted to amplifier 23, is then used to vary the signal from the data print control signal means, varying either the frequency or the length of pulses sent to electrode 21. Thus, for example, in operation, when the carriage starts up or slows down, the corrective signal is such as to effect a corresponding decrease in pulse frequency or pulse length so that the same amount of ink per unit length of line reaches receptor 24 as when the carriage is moving at full velocity.

A somewhat more simple sensing and control system using two code disks is illustrated in FIG. 5 in which like reference numerals are used to refer to the same components. In the embodiments of FIG. 5, a code disk 50 is mechanically linked to a roller 6 associated with the Y-drive and a code disk 51 is mechanically linked to a roller 12 associated with the X-drive. Disk 50, in accordance with known practice, has a pick-up head 52 connected to a pulse generator 53 and disk 51 has a pick-up head 54 connected to pulse generator 55. It has proved sufficient in many cases to simply add the pulses generated by code disks 50 and 51 in a summing amplifier 56 and use the signal from this summing amplifier device as the corrective signal. It will be apparent from the description of FIG. 5 that this apparatus shown is suitable for correcting line width only by adjusting the frequency of pulses fed to summing amplifier 23.

FIG. 6 illustrates apparatus in which differentiators are used to determine X- and Y-velocity signals. The ink jet system and the traveling carriage are, for purposes of illustration, the same as shown in FIGS. 2–4. Only the Y-drive is shown in detail in FIG. 6, that for the X-drive being similar. An X-differentiator 60 and a Y-differentiator 61 are included in X- and Y-circuitry which in each case includes a feed back loop to the servo motors.

The output from these differentiators, which are signals representative of X-velocity and Y-velocity, respectively, are fed to a function generator 44 which in turn generates the necessary corrective signal transmitted to a summing amplifier 62 which also receives data print control signals from source 22.

The relative movement functions may be accelerations and decelerations in the X- and Y-directions and the apparatus for using such measurements is shown diagrammatically in FIG. 7. An accelerometer 65 is mechanically linked to a roller 6 (FIG. 3) and the signal obtained is then integrated in an integrator 66 to produce a signal proportional to the Y-direction velocity. In like manner, accelerometer 67 is linked to a roller 12 (FIG. 4) and the signal obtained is then integrated in an integrator 68 to produce a signal proportional to the X-direction velocity. These two signals are processed in a function generator 69 to give the required corrective signal.

FIG. 2-7 illustrate apparatus in which the relative movement between the ink-jet device and receptor surface is achieved by moving the traveling carriage on which the ink-jet device is mounted in both the X- and Y-directions. It is, however, within the scope of this invention to move the traveling carriage in one direction and the receptor in the other direction. Such an apparatus is illustrated in perspective view of FIG. 8 in which the carriage is moved in the X-direction, i.e., in a horizontal plane and the receptor is moved in the Y-direction, i.e., in a vertical plane.

In FIG. 8 the ink-jet device 75 comprises an ink supply capillary 76, terminating in a nozzle 77 which forms droplets 78, an electrode system 79, conduit means 80 linking capillary 76 to an ink source (not shown), an electrode 82 within capillary 76, an amplifier 83 and a source 84 of data print control signals. Electrode system 79 and capillary 76 are mounted in their desired relative positions on traveling carriage 85 which is slidably movable in a horizontal plane along parallel rods 86 held in position by rod supports 87. Carriage 85 is affixed on either side to an endless cord 88 which is driven around rollers 89 and 90 by driving roller 89 which is mechanically linked to stepping motor 91 having a driver 92.

The receptor surface, shown as a continuous strip of paper 95, is mounted on two rollers 96 and 97 to be in a plane essentially normal to the axis of the stream of droplets 78. Rollers 96 and 97 are driven by stepping motors 98 having a driver 99. In the apparatus of FIG. 8, the driving pulses fed into stepping motors 91 and 98 through drivers 92 and 99, respectively, are used as output signals representative of X-data and Y-data steps and the frequencies are representative of X- and Y-velocities. These signals when processed in function generator 100 provide the required corrective signal furnished to the amplifier 83 of the jet-writing device.

It is, of course, within the scope of this invention to use stepping motors in place of the servo motors of FIGS. 2-7 and to use servo motors with tachometers, code disks, differentiators or accelerometers in the apparatus of FIG. 8 as well as to use a carriage which moves in only one direction and a receptor which moves in the other direction in the apparatus of FIGS. 2-7 and a carriage which moves in both directions in the apparatus of FIG. 8. These different embodiments and modifications need not be further illustrated since they are within the skill of the art.

In the apparatus of FIGS. 2-4 and 6-8 it is possible to maintain the pulse length constant and vary the pulse frequency or to maintain the pulse frequency constant and control the pulse length by means of one of the generated corrective electric signals which are approximately proportional to the plotting speed. In these cases, the amount of ink applied to the drawing surface per unit of length will also be practically independent of the plotting speed.

It is also obvious that a combination of pulse length and frequency modulation can be used to the same effect, and that it is possible to change the line width independently of the plotion speed by changing the relation of the plotting speed to the pulse length or pulse frequency of the control signal.

It is, however, not possible to produce, in this manner, plotted traces of a width greater than about one-half mm. If, on the other hand, the nozzle from which the ink jet emerges is vibrated at right angles to the direction of the ink jet in the manner described in U.S. Pat. No. 3,737,914, FIG. 1, it is possible to plot, for example, a sinusoid curve on the drawing surface. If, in this instance, the relative speed between the drawing surface and the ink jet is small and at right angles to the direction of vibration of the ink jet, it is possible to produce thick lines, since the plotted traces in the sinusoid curve overlap each other. Then, the amplitude of the sinusoid curve determines the width of the lines. It is obvious that the amount of ink which is required in this case for a good contrast is greater than if one plots a line with a nonvibrating ink jet. In this case, the pulse frequency or pulse length must not, therefore be determined by the plotting speed along but also by the amplitude of the periodic transverse vibration executed by the ink jet.

Because these plotted traces making up the wide lines, are sinusoidal, the writing speed of the jet on the paper changes the sinusoid in such a way that it is largest in the middle of the sine wave and smallest at its extremes. This results in a slight difference of density of the lines or characters generated in this way, that is, the density of a line will be larger at its boundaries than in the middle. To avoid this it is advantageous to control the pulse length of the controlling pulse signal not only by the width of the line to be drawn but also by the actual velocity of the vibrating jet on the paper. In this way a constant density of the track can be achieved. To attain this, suitable electronics are included to ensure synchronization between the vibration of the jet and the device controlling the pulse length of the controlling pulse signal.

FIG. 9 illustrates, in perspective view, a modification of the apparatus of FIG. 8 designed to form relatively thick lines of predetermined width using a vibrating nozzle and optional means to sense the actual velocity of the vibrating jet to effect further control of the pulse signal fed to the ink-jet writer. In FIG. 9, like reference numbers identify like components of FIG. 8. Vibration of capillary 76, and hence of nozzle 77, is attained in the manner described in U.S. Pat. No. 3,737,914. Capillary 76 is fixedly mounted in a support 105 affixed to carriage 85 and it extends through an opening in plate 106 toward control electrode 71. Plate 106 is secured to a resilient means such as leaf spring 107 which in turn is attached to a support plate 108 also affixed to carriage 85. Means to oscillate leaf spring 107 are provided and in FIG. 9 are shown as an electromagnet 109 attached to an a-c source, not shown. Application of an a-c current to electromagnet 109 causes plate 106, and hence nozzle 77, to vibrate horizontally as indicated by the arrows, and to form a line 110 on receptor 95, the width of the line, W, being equivalent to the total distance of travel of plate 106, as shown in FIG. 10.

As described in U.S. Pat. No. 3,737,914, such apparatus embodying means to vibrate one or more ink-jet nozzles lends itself to the generation of alphanumerical characters, signs and symbols. This is also true of the apparatus of FIG. 9 which has the added capability of forming such characters, signs or symbols with controlled line widths.

In order to determine a function of the velocity of travel experienced by plate 106, and hence nozzle 77, means are affixed to plate 106 for this purpose. Such means are shown in FIG. 9 to comprise a bar magnet 115, one pole of which extends into coil 116 held to carriage 85 by insulating support 117. The resulting velocimeter serves as a linear generator, the output of which varies with the velocity of movement of plate 106 and therefore of nozzle 77. The output of coil 116 can therefore be transmitted to function generator 118 which also receives pulse rate signals from stepping motors 91 and 98. Thus the corrective signal generated is one which takes into account the relative movement between the ink-jet writer and receptor in the X- and Y-directions as well as the amplitude of the periodic vibration of the ink jet. In some applications it is possible to tolerate variation in width of the sinusoid lines formed in vibrating the ink jet and in such instances the means for measuring the velocity of plate 106 travel and the signal such means generates may be omitted from the apparatus.

It is obvious that the plane of the vibration of the nozzle when drawing fine lines or characters should be approximately perpendicular to the direction of motion of the recording head. Because of this it may be desirable to use a suitable mechanical method to ensure this. One possible solution is to turn the vibrating nozzle arrangement by a small motor in such a way that it always fulfills the relation between the directions mentioned above. However, other appropriate methods can also be used.

The same type of apparatus may be used if the ink-jet is made to execute other forms of periodic movements. Advantageously, it can be made to describe, for example, a saw-tooth curve it the aim is to plot alphanumeric symbols in accordance with U.S. Pat. No. 3,737,914. In this case it can also be advantageous to cause the frequency of this saw-tooth movement of the ink jet to be controlled by the speed of the recording head relative to the receptor which means that not only the density of the alphanumeric symbols will be constant but also that their width or height will be independent of the speed of the recording head.

FIG. 11 illustrates a mechanism for eliminating the need for a motor to turn the vibrating nozzle to continuously fulfill the requirement that the plane of the vibration of the nozzle be perpendicular to the direction of the motion of the recording head. The mechanism of FIG. 11 is a modification of the apparatus of FIG. 9. In addition to the means for vibrating nozzle 76 is one direction (e.g., the X-direction), there are provided means, such as electromagnet 111, to drive it in another direction 90° out of phase with the first direction (e.g., in the Y-direction). Thus by affixing electromagnet 111 to leaf spring 112 and connecting it to a second a-c current source (not shown) the ink jet is made to continuously inscribe a closely spaced spiral as illustrated in FIG. 12, the diameter of any loop of which determines the final width of the line drawn. If desirable, the velocity of vibration in the Y-direction may be determined through the use of a bar magnet 113, one pole of which is movable within coil 114 and the signals thus generated may be fed, along with those from coil 116, to function generator 118 to generate a corrective signals reflecting the velocities of the relative movements of the carriage and receptor as well as of the two vibratory motions 90° out of phase.

It is obvious that the apparatus and method of this invention for regulating the amount of ink in the trace plotted can be used not only in connection with the above-mentioned X-Y plotter but also for normal ink-jet oscillographs in accordance with U.S. Pat. No. 2,566,443. In like manner, in these oscillographs the plotting speed is altered within broad limits in response to the amplitude and frequency of the signal to be recorded and the speed at which the recording paper is advanced. If this plotting speed is too low, the amount of ink on the paper will be too great, which causes large droplets and irregularities in the width of the trace plotted.

Finally, the apparatus of this invention may use other continuous ink-jet devices as represented by the type described in U.S. Pat. No. 3,596,275 and on-demand ink-jet devices as represented in U.S. Pat. No. 3,747,120. FIGS. 13 and 14 illustrate the use of such ink-jet devices. In FIG. 13, an ink-jet device, generally indicated by reference numeral 120 comprises a feed pipe 121 terminating in nozzle 122, a control electrode 123 for charging each individual droplet 124, and a pair of electrostatic deflecting plates 125 and 126. A receptor 127 is also provided. The ink-jet device 120 is mounted on a traveling carriage such as illustrated in FIG. 2 or FIG. 8 to effect relative movement between it and receptor 127. Any of the above described means may be used for sensing relative movement functions and for using them to develop a corrective function for transmittal to amplifier 128 along with the data print control signal. The application of such a corrective signal alters the function performed by control electrode 123.

In FIG. 14 the ink-jet device 130, of the on-demand type, is mounted on a carriage and comprises a fluid chamber 131 terminating in nozzle 132 and supplied with ink through intake channel 133 having appropriate inlet means 134. Chamber 131 has defined therein a relatively large fluid contact area 135 terminating in a pressure diaphragm 136 affixed to a piezoelectric crystal 137 having suitable control electrode means to apply voltage thereto. The application of a data print control signal through amplifier 138 forces piezoelectric crystal 137 to contract radially thus bending plate 136, an action which applies pressure to the fluid in chamber 131 and forces out a liquid droplet 139. By providing a corrective signal through any of the means previously described it is possible to control the pulse frequency in ink-jet device 130 and hence to develop uniform line thickness on receptor 140.

Although ink has been used as exemplary of the liquid discharged by the jet device, it will be obvious that liquids other than ink (e.g., liquids which can be developed or which react with a reagent in the receptor surface) can be used; and that receptors other than paper can be used as plotting or drawing surfaces.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. An ink-jet printer apparatus, comprising in combination
   a. receptor means on the surface of which a plot or drawing is formed to comprise at least one line of predetermined width;
   b. an ink-jet system comprising in combination
      1. nozzle means,
      2. ink supply means,
      3. droplet forming means including means to force ink from said supply means under pressure through said nozzle means thereby to form a stream of spaced droplets,
      4. control electrode means for impressing a charge on selected of said droplets thereby to control the final disposition of said droplets,
      5. deflecting plate means defining on electrical field through which said droplets pass, and
      6. nozzle vibrating means to vibrate said nozzle both through a predetermined distance in a plane transverse to the plane of said receptor and transverse to the direction of said relative movement and in a direction 90° out of phase with said means to vibrate it transverse to said direction of said relative movement;
   c. data print control signal means to transmit signals to said electrode means predeterminative of said final disposition of said droplets whereby the magnitude of said charge on each of said droplets is determined by said signals;
   d. traveling carriage means on which said ink jet system is mounted;
   e. means to effect relative movement between said carriage means and said receptor, said relative movement being variable with respect to both velocity and direction;
   f. data position signal means to control relative movement between said receptor means and said traveling carriage means;
   g. means for sensing at least one relative velocity function between said carriage means and said receptor substrate means;
   h. means for sensing the movements of vibration of said nozzle;
   i. means to generate a function of said vibration movements;
   j. means to combine said function of said vibration movements with said at least one relative function thereby to generate a combined relative velocity function; and
   k. means for controlling the signal from said data print control signal means as a function of said relative combined functions.

2. A method for making X-Y plots and mechanical drawings used data taken from a source, comprising the steps of
   a. providing a source of a liquid ink;
   b. forcing said ink under pressure through a nozzle thereby to form a stream of liquid droplets;
   c. impressing an electrical charge on selected of said droplets;
   d. then directing said droplets through an electrical field thereby to control the final disposition of said droplets on a receptor;
   e. effecting relative movement between said nozzle and said receptor, said relative movement being variable with respect to both velocity and direction;
   f. determining a velocity function of said relative movement to generate a first signal;
   g. vibrating said nozzle both through a predetermined distance in a plane transverse to the plane of said receptor and transverse to the direction of said relative movement and in a direction 90° out of phase with said vibrating transverse to said direction of said relative movement;
   h. determining a movement function of said vibrating of said nozzle to generate a second signal;
   i. combining said first and second signals to generate a corrective signal; and
   j. employing said corrective signal to adjust said impressing said electrical charge on said selected of said droplets.

* * * * *